United States Patent [19]

Seletti

[11] Patent Number: 5,284,668
[45] Date of Patent: Feb. 8, 1994

[54] METHOD FOR MAKING TOASTED BREAD SLICES

[75] Inventor: Roberto Seletti, Parma, Italy

[73] Assignee: Barilla G.E.R. L.LLI - Societa per Azioni, Parma, Italy

[21] Appl. No.: 970,924

[22] Filed: Nov. 2, 1992

Related U.S. Application Data

[62] Division of Ser. No. 826,387, Jan. 27, 1992, Pat. No. 5,265,524.

[30] Foreign Application Priority Data

Jan. 28, 1991 [IT] Italy .......................... MI 91A 000200

[51] Int. Cl.$^5$ .............................................. A21D 8/00
[52] U.S. Cl. ...................................... 426/466; 426/520
[58] Field of Search .................. 426/520, 466; 99/386, 99/443 C; 198/833, 458, 636

[56] References Cited

U.S. PATENT DOCUMENTS

| | | | |
|---|---|---|---|
| 2,017,991 | 10/1935 | Rondolin | 198/833 |
| 3,065,079 | 11/1962 | Elliott | 99/386 |
| 4,135,077 | 1/1979 | Wills | 99/386 |

FOREIGN PATENT DOCUMENTS

| | | | |
|---|---|---|---|
| 1137701 | 10/1962 | Fed. Rep. of Germany | 99/443 C |
| 200418 | 3/1965 | Sweden | 99/443 C |
| 1110726 | 8/1984 | U.S.S.R. | 198/636 |
| 1283171 | 1/1987 | U.S.S.R. | 198/833 |
| 1406094 | 6/1988 | U.S.S.R. | 198/636 |
| 223089 | 10/1924 | United Kingdom | 99/443 C |

*Primary Examiner*—George Yeung
*Attorney, Agent, or Firm*—Sughrue, Mion, Zinn, Macpeak & Seas

[57] ABSTRACT

In moving through a toasting oven, the first and last of a plurality of rows of bread slices to be toasted have their outward sides in heat exchange relationship with metal masses.

1 Claim, 2 Drawing Sheets

METHOD FOR MAKING TOASTED BREAD SLICES

This is a divisional of application Ser. No. 07/826,387 filed Jan. 27, 1992 now U.S. Pat. No. 5,265,524.

BACKGROUND OF THE INVENTION

This invention relates to a method for making toasted bread slices.

It is a known fact that in the making of toasted bread slices on a commercial scale, tunnel-type ovens are generally employed which are some length and passed through continuously by an endless net-type belt conveyor wherein slices of bread to be toasted are laid in a plurality of adjacent rows which may include up to 38-40 such rows of slices.

The tunnel-type oven is equipped with suitable heaters which are distributed along the oven length and operated to establish, throughout the oven length, a temperature diagram which is pre-set experimentally for optimum toasting of the slices.

Also known is, however, that despite the care and engineering applied to the process, the slices in the first and last rows frequently reveal, on exiting the oven, excess toasting or even peripheral burning which may vary in extent but nearly always result in these having to be discarded.

In consideration of that the slices in the other rows are toasted in full conformity with their commercially applicable standards, and in particular that the slices in the central rows show optimum toasting, it has been thought that the problem was due to the slices in the first and last rows being thermally unprotected by any other slices along their outward sides, being instead exposed to an amount of heat and temperatures which are apparently excessive.

Efforts made to lower the oven temperature, while possibly extending the residence time of the slices to be toasted therein, have yielded negative results, mainly on account of difficulties in effectively controlling the temperatures and the complexity brought about by the provision of additional heating means.

The underlying problem of this invention is to provide a method and an apparatus for making toasted bread slices on a commercial scale, thereby definitely obviating the above-noted technical drawback in a simple and economical way.

SUMMARY OF THE INVENTION

This problem is solved according to the invention by a method for making toasted bread slices in a tunnel-type oven, wherein the bread slices are laid in a plurality of side-by-side rows on a continuous conveyor moving through said oven, the improvement consisting in that the bread slices in the first and last rows are put, throughout their movement through the oven, in heat exchange relationship with masses of a good heat-conductive metal which are arranged at the outward sides of said slices all along the oven length.

Advantageously, each bread slice in the first and last rows of slices is put in heat exchange relationship with a respective metal mass which will accompany it along the entire path of travel through the tunnel-type oven.

The features and advantages of this invention will be apparent from the following detailed description of and embodiment of the inventive method, given with reference to the accompanying illustrative and non-limitative drawings depicting an apparatus for the implementation thereof.

DETAILED DESCRIPTION OF THE INVENTION

Figure 1:
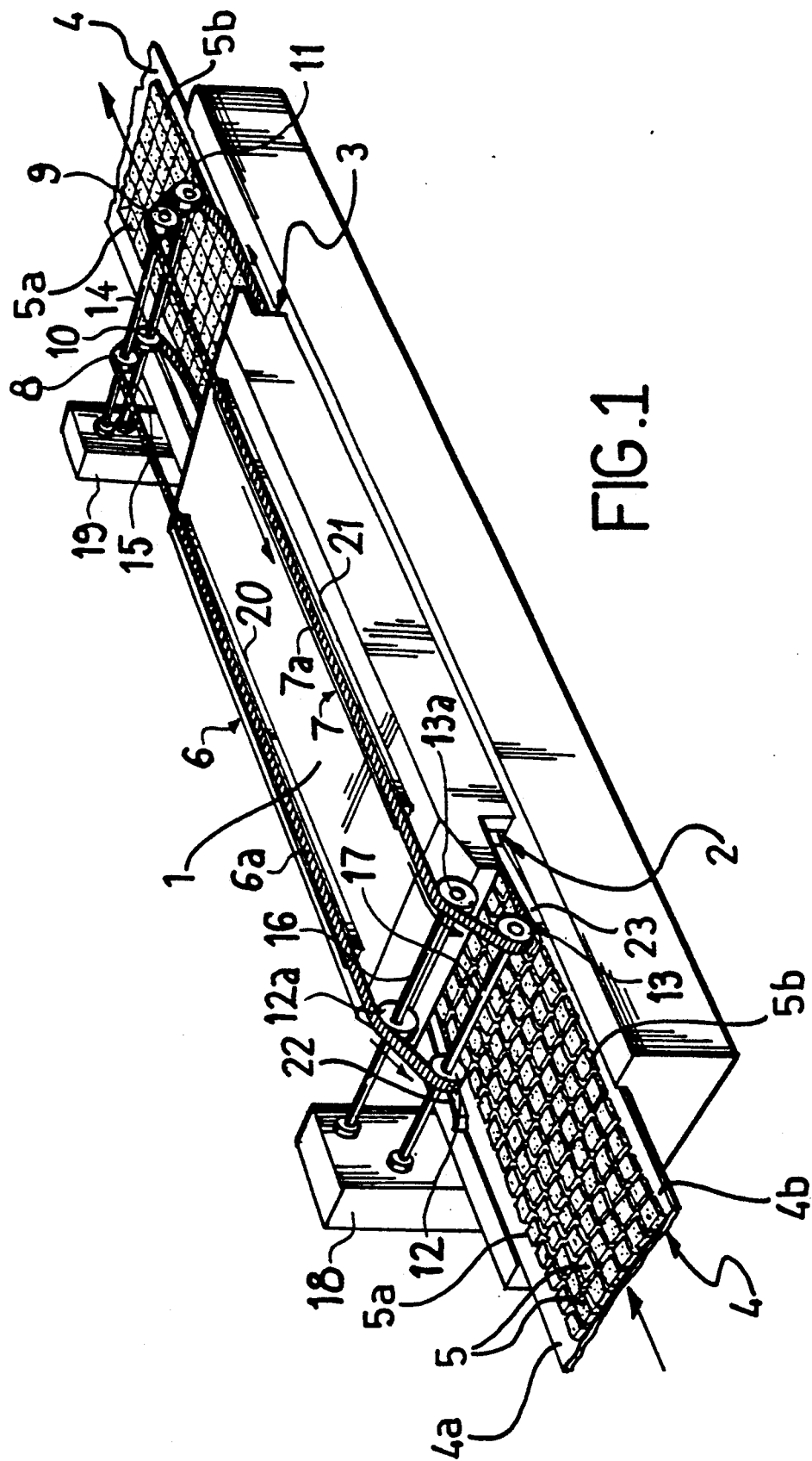
FIG. 1 shows schematically an apparatus according to the invention in prospective.
Figure 2:
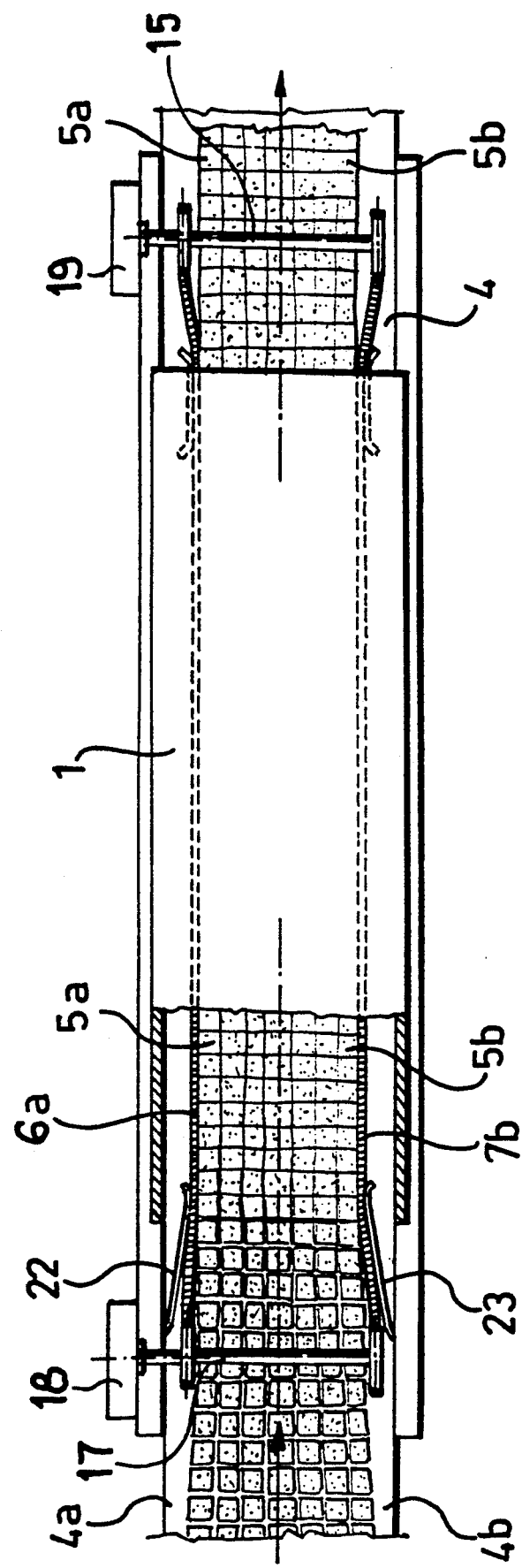
FIG. 2 is a part-sectional top plan view of the same apparatus as in FIG. 1.

With reference to the drawing views, schematically shown at 1 is a tunnel-type oven as conventionally employed for toasting slices of bread and the like. Through the oven 1, from the inlet end 2 to the outlet end 3 thereof, there extends an endless conveyor 4, e.g. of the net or mesh belt type, on which bread slices 5 to be toasted are orderly arranged adjacent to one another in a plurality of side-by-side rows. The first and last of said rows, comprising slices designated 5a, extend at a spacing from the outward sides of the conveyor 4, wherewith they define respective edges 4a, 4b unencumbered by slices.

Indicated at 6, 7 are two identical, large-size link chains which extend longitudinally of the oven and are supported, externally therefrom at the inlet 2 and outlet 3 ends, around respective sprocket wheel 8-9, 10-11, 12-13, and 12a-13a.

These sprocket wheels are carried on shaft pairs 14,15 and 16,17 which span the conveyor 4 bridge-fashion and are journalled for free rotation on upright structures 18,19 placed in the proximities of the inlet 2 and outlet 3 ends of the oven 1.

Said chains 6,7 have upper runs 6a, 7a extending above the tunnel-type oven 1, and lower runs 6b, 7b extending through the tunnel interior all along its length.

The chains 6,7 are stretched with an appropriate amount of slack therein, so that their lower runs 6b, 7b will rest positively on the edges 4a, 4b unoccupied by any slices of the conveyor 4. The upper runs 6a, 7a are advantageously guided in respective straight enclosing tracks 20,21 attached to the roof of the tunnel-type oven 1.

On either sides of the inlet mouth 1a of said tunnel-type oven 1, there are associated respective diverting means 22,23 basically comprised of metal leaves lying edge-wise along the edges 4a, 4b of the conveyor 4 outwardly from the oven 1. These metal leaves 22,23, which are set preferably convergent to the oven inlet, are arranged to resiliently press on the lower runs 6b, 7b of the chains 6,7 from outside, thereby urging them toward the first and last rows of slices to establish substantial contact with the outward sides of the slices 5a, 5b in said rows of slices. It should be noted that the layout of the diverting means 22, 23 and their action are such that said contact of the chains with the slices in the first and last rows will take place at the inlet of the tunnel-type oven or immediately ahead thereof. This contact relationship is maintained throughout the oven length, and at the exit therefrom, as far as the location of the sprocket wheels, 10, 11.

It should be further noted that, on account of the slack purposely provided in the stretch of the chains 6, 7, their lower runs will apply their weight to the conveyor 4, and that the friction between them and the conveyor will be sufficient to to cause a displacement of the chains on their respective support sprocket wheels.

Thus, the chains are caused to run through the oven at the same speed as the slices, thereby each chain link (or plurality of links) put in contact with a respective slice at the oven inlet will accompany it all along its travel path through the oven.

In accordance with the method of this invention, the slices 5a, 5b in the first and last rows of slices 5 to be toasted are put in a relationship of heat exchange with respective masses of a heat conductive metal formed, in the inventive apparatus, by the links of the chains 6,7, which accompany them from the inlet end of the tunnel-type oven to the outlet end all along their path of travel therethrough.

Heat exchange takes place by the outward sides of the slices 5a, 5b contacting said respective metal masses, which lie on the edges 4a, 4b of the conveyor 4 left unencumbered by slices.

It matters that no metal mass should separate from its respective slice of bread along said path, and accordingly, they should be moved at the same speed. With the apparatus of this invention, it is found that the frictional resistance between the lower runs 6a, 7a of the chains 6, 7 and the conveyor 4 is more than adequate to meet this demand; however, where a more positive action is sought, it will suffice that one of the entrainment and deflection shafts for the chains 6,7 be power driven.

On exiting the tunnel-type oven 1, the metal masses are moved away from their respective toasted bread slices and brought back to room temperature in readiness for re-entering the oven. With the chains 6,7, it has been found that the return travel of the chains above the tunnel-type oven is adequate for the purpose.

With the method of this invention, optimum toasting of the bread slices has been achieved even in the first and last rows of slices.

An important aspect of this invention is, in this respect, that the metal masses corresponding to each row are also put in mutual heat exchange relationship.

The inventive apparatus has shown to provide a simple, effective and reliable implementation of the method according to this invention.

What is claimed is:

1. A method for making toasted bread slices in a tunnel-type oven comprising:
    laying bread slices in a plurality of side-by-side rows on a continuous conveyor moving through said oven with first and last rows being spaced from opposite sides of said conveyor;
    placing a plurality of links of two endless chains on said conveyor adjacent opposite sides thereof with links of each chain being disposed in heat exchange relationship with slices in said first and last rows respectively along the oven length whereby excess toasting of the outward sides of said slices is prevented; and
    moving the chains and conveyor at the same speed through said oven.

* * * * *